United States Patent Office 3,256,284
Patented June 14, 1966

3,256,284
OXAMIDE DERIVATIVES
Andre Rio, Lyon, France, assignor to Rhone-Poulenc
S.A., Paris, France, a corporation of France
No Drawing. Filed July 2, 1963, Ser. No. 292,458
Claims priority, application France, July 9, 1962, 903,379
10 Claims. (Cl. 260—268)

This invention relates to diols and their production.

The invention provides new diols of the general formula:

HO—Y—NH—CO—CO—Z
—CO—CO—NH—Y—OH   I where Y represents an alkylene group, containing, e.g., up to twelve, but preferably 2 to 4, carbon atoms, and Z represents a 1,4-piperazino group, unsubstituted or substituted by, e.g., up to four lower alkyl groups, or a group of formula:

—NH—X—A—X—NH— where X represents a divalent hydrocarbon group, e.g. alkylene or alkenylene of up to 12 carbon atoms, but preferably phenylene and especially m- or p-phenylene, A represents —O—, —SO$_2$—, or

and X' represents a monovalent hydrocarbon group, e.g. a phenyl group, but preferably a lower alkyl group of up to 4 carbon atoms.

These new diols are industrial products of value in the preparation of polymers such as polyesters and polyurethanes on which the presence of oxamide groupings confers advantageous properties.

The invention also provides a process for the preparation of the diols of Formula I, which comprises reacting a dialkyl ester of oxalic acid with a diamine of formula H—Z—H, using at least two mols of ester per mol of diamine, and reacting the oxamic diester obtained with an amino-alcohol of formula: HO—Y—NH$_2$ (where Y and Z are as above defined), using at least two mols of amino-alcohol per mol of oxamic diester. The first stage of the process produces an oxamic diester of the formula:

ROOC—CO—Z—CO—COOR

The second stage of the process converts this oxamic diester into the desired diol of Formula I.

The first stage of the process is carried out in accordance with known methods and a large molar excess of the dialkyl oxalate is preferably reacted with the diamine in order to avoid the formation of polyoxamides [see Meyer et al., Chemische Berichte, 29, 2640 (1896); and Gray et al., J. Chem. Soc., 43 (1942)]. It is, for example, advantageous to react 4 to 6 mols of diester with one mol of the diamine in the absence of a diluent, the said diester acting as the only solvent in the reaction, and to recycle unconverted diester after separating it from the alcohol which is formed. This aminolysis reaction is conveniently carried out by simply heating the reaction mixture in the absence of water, either under reflux or distilling the liberated alcohol as it is formed. On cooling the reaction mixture, the oxamic diester formed precipitates out from the oxalic diester.

In the second stage of the process, 2 mols of aminoalkanol are preferably reacted with one mol of the oxamic diester dissolved in an inert organic solvent, such as, for example, a halogenated aliphatic hydrocarbon or an alicyclic ether or aromatic hydrocarbon, at room temperature (e.g. 18–25° C.) with stirring. The diol of Formula I thus formed precipitates, and is easily separated from the reaction mixture, for example by filtration. In order to facilitate this precipitation, it is sometimes advantageous to concentrate the reaction mixture by heating, thus to eliminate the alcohol formed and possibly also a part of the solvent used. It is generally advantageous to purify the diols thus obtained by washing them with an appropriate organic solvent, especially ethanol.

The diols of Formula I are solid products which are resistant to heat, generally soluble in dimethylformamide, but insoluble or sparingly soluble in water, benzene and ethyl alcohol. They impart to the polymers formed from them a good thermal stability and a high melting point; in addition, the presence of particular functional groups in their molecules makes it possible for certain characteristics of the polymers to be improved. For example, the diols of Formula I which contain a piperazine ring or a sulphone group can be used in the manufacture of polymers having good affinity for dyes.

The following examples illustrate the invention.

Example 1

50 g. of p,p'-diaminodiphenylsulphone and 500 g. of diethyl oxalate are placed in a one-litre flask and heated to boiling point for 2 hours, the ethyl alcohol being eliminated as it is formed. By cooling the reaction mixture, a precipitate is formed which is filtered off, washed with 2 x 300 cc. of petroleum ether, and dried in an oven, 83 g. of p,p'-bis(ethyl oxamate)diphenylsulphone is then obtained.

12.5 g. of this product are dissolved in 500 cc. of tetrahydrofuran and to this solution is added 3.4 g. of ethanolamine in solution in 150 cc. of the same solvent at ordinary temperature (20–22° C.) and with vigorous stirring.

After the reaction mixture has been stirred for 30 minutes, it is concentrated by heating to approximately a third of its original volume. After the concentration, a precipitate is formed which is filtered off, washed with 2 x 100 cc. of chloroform and then dried in an oven. 10 g. of a solid product melting at 265–269° C. are obtained.

After washing with hot ethanol, a purified product which melts at 296–297° C., is obtained, having the formula:

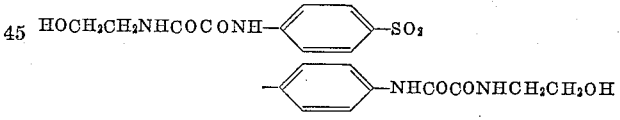

It is soluble in dimethylformamide, and sparingly soluble in water, benzene and ethyl alcohol.

Example 2

Operating in the same way as in Example 1, 50 g. of methyl-bis-(m-aminophenyl)phosphine oxide and 500 g. of ethyl oxalate are reacted by heating to boiling point for 2 hours. The precipitate formed on cooling is filtered off, washed with 2 x 300 cc. of cyclohexane, and then recrystallised and dried. 80 g. of a solid product which melts at 104–107° C. and having the formula:

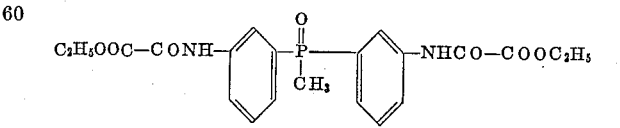

are thus obtained.

22.3 g. of this compound are dissolved in 300 cc. of chloroform and to this solution is added 6.1 g. of ethanolamine in 20 cc. of the same solvent at normal temperature and with stirring. The precipitate which forms is separated by filtration, washed with 2 x 200 cc. of chloroform, and then dried in an oven. There are thus obtained 9 g. of a solid product melting at 111–114° C. This product, after treatment with absolute ethanol in a Kumagawa apparatus, gives a product melting at 158–160° C. and having the formula:

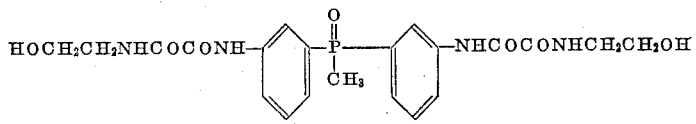

It is soluble in dimethylformamide, pyridine, and ethyleneglycol, sparingly soluble in methanol, ethanol, water, and acetone, and insoluble in tetrahydrofuran, chloroform, and benzene.

Example 3

20 g. of p,p'-diaminophenylether and 200 g. of ethyl oxalate are reacted by heating at boiling point for 2 hours, and the reaction mixture is then concentrated to about one third of its volume. By cooling the concentrated mass, there is obtained a precipitate, which is filtered, washed with 2 x 100 cc. of cyclohexane and dried in an oven. 28 g. of a solid product melting at 150–152° C. are obtained, corresponding to the formula:

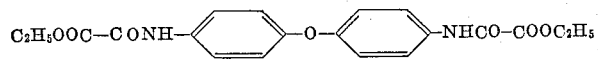

It is soluble in tetrahydrofuran, chloroform, and dioxane, but sparingly soluble in benzene and ethyl alcohol.

To a solution of 20 g. of this compound in 300 cc. of chloroform is added, at normal temperature and with stirring, 6.1 g. of ethanolamine in solution in 100 cc. of chloroform. A precipitate is formed which is separated by filtration, washed with 2 x 100 cc. of chloroform, and dried in an oven. 18 g. of a product melting at 293–296° C. with a hydroxyl number of 7.8 and the formula:

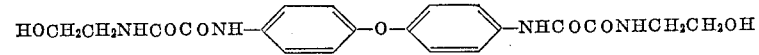

are obtained. It is soluble in dimethylformamide, insoluble in chloroform and tetrahydrofuran and moderately soluble in benzene, ethyl alcohol and water.

Example 4

Operating in the same way as in Example 3, by heating 50 g. of piperazine with 500 g. of ethyl oxalate, and concentrating the reaction mixture, there are obtained 147 g. of a product, M.P. 116–118° C., having the formula:

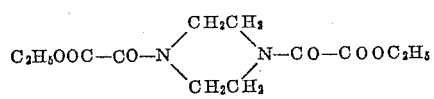

28.6 g. of this compound are dissolved in 500 cc. of chloroform and to this solution are added, at normal temperature, 12.2 g. of ethanolamine in solution in 50 cc. of chloroform. The precipitate is separated from the reaction mass by filtration, washed with 2 x 100 cc. of cyclohexane, and then dried in an oven. 19 g. of a product melting at 183–185° C. are obtained. After washing with ethanol and drying, the product melts at 187–188° C. It has the following formula:

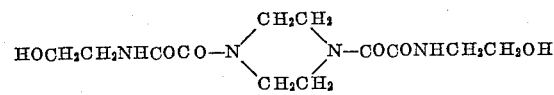

This diol is soluble in water and dimethylformamide, and insoluble in benzene, tetrahydrofuran and ethyl alcohol.

I claim:
1. Diols of the formula:

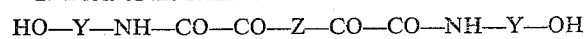

where Y represents alkylene of 2 to 4 carbon atoms and Z represents a member selected from the class consisting of

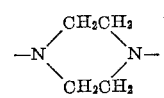

and groups of formula —NH—X—A—X—NH— where X represents a phenylene group and A represents a member selected from the class consisting of —O—, —SO$_2$—, and

where X' represents alkyl of up to four carbon atoms.

2. Diols of the formula:

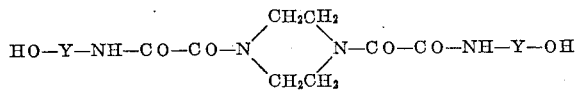

where Y is alkylene of not less than two nor more than four carbon atoms.

3. Diols of the formula:

HO—Y—NH—CO—CO—NH—X—O—
    X—NH—CO—CO—NH—Y—OH where Y is alkylene of not less than two nor more than four carbon atoms and X is phenylene.

4. Diols of the formula:

HO—Y—NH—CO—CO—NH—X—
    SO$_2$—X—NH—CO—CO—NH—Y—OH where Y is alkylene of not less than two nor more than four carbon atoms and X is phenylene.

5. Diols of the formula:

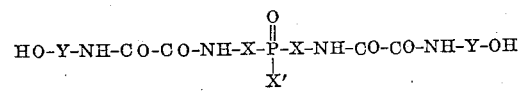

where Y is alkylene of not less than two nor more than four carbon atoms, X is phenylene, and X' is alkyl of up to four carbon atoms.

6. The diol of formula:

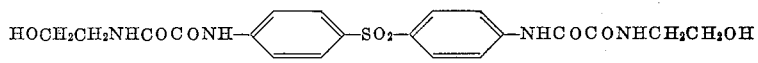

7. The diol of formula:

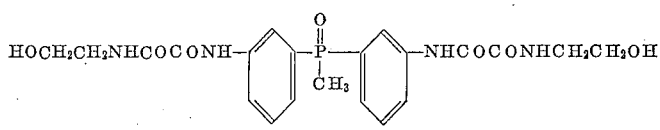

8. The diol of formula:

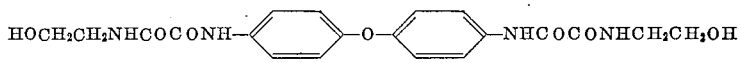

9. The diol of formula:

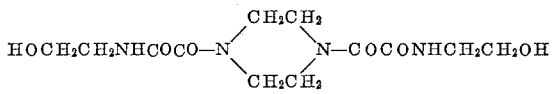

10. Diols of the formula:

HO—Y—NH—CO—CO—Z—CO—CO—NH—Y—OH where Y represents alkylene of up to 12 carbon atoms and Z represents a member of the class consisting of a 1,4-piperazino group and groups of formula:

—NH—X—A—X—NH— where X represents a divalent hydrocarbon radical selected from the class consisting of alkylene of up to 12 carbon atoms, alkenylene of up to 12 carbon atoms and phenylene, and A represents a member of the class consisting of —O—, —SO$_2$—, and $$-\overset{\overset{\displaystyle O}{\|}}{\underset{\underset{\displaystyle X'}{|}}{P}}-$$

where X' represents alkyl of up to 4 carbon atoms or phenyl.

References Cited by the Examiner

FOREIGN PATENTS 1,338,399   8/1963   France.

OTHER REFERENCES

De Vries: Recueil des Travaux Chimiques des Pays-Bas, vol. 61, pages 223–243.

NICHOLAS S. RIZZO, *Primary Examiner.*

HENRY R. JILES, *Examiner.*

JAMES W. ADAMS, *Assistant Examiner.*